United States Patent Office 3,091,645
Patented May 28, 1963

3,091,645
BISPHENOL PREPARATION
Albert L. Rocklin, Walnut Creek, Calif., assignor to Shell Oil Company, a corporation of Delaware
No Drawing. Filed Nov. 2, 1959, Ser. No. 850,120
8 Claims. (Cl. 260—619)

This invention relates to the preparation of bisphenols and, more particularly, to a novel and useful process for preparing bis(dialkyl-hydroxyphenyl)methane.

Bis(3,5 - dialkyl - hydroxyphenyl)methanes are useful antioxidants, particularly for the stabilization of such organic materials as natural and synthetic rubber, synthetic resins such as polyethylene and polypropylene, and lubricating or industrial oils. Conventionally, such bisphenols have been prepared by the acid- or base-catalyzed condensation of dialkylphenols such as 2,6-di-t-butyl phenol or 2,4-di-t-butyl phenol, with formaldehyde in aqueous or alcoholic media. Such processes are exemplified by that described in a recent patent to Filbey et al., U.S. 2,807,653, wherein dialkylphenol and aqueous formaldehyde are condensed in alcoholic media in the presence of alkali metal hydroxide to yield bis-(dialkyl-hydroxyphenyl)methane.

An alternative route, made possible by the availability of dialkyl hydroxybenzyl alcohols, is the direct condensation of such alcohols with dialkylphenols to yield the methane bisphenols. Although 3,5-dimethyl-4-hydroxybenzyl alcohol has been reported to condense with 2,6-dimethyl phenol in an aqueous solution containing equimolar amounts of the two reactants and sodium hydroxide, condensation of the 2,4-dimethyl phenol with 3,5'-dimethyl-2-hydroxybenzyl alcohol gave a resinous mass rather than a bisphenolic product. Even the former reaction cannot be conducted in aqueous media with reactants having larger alkyl substituents, since these reactants are insoluble therein. Furthermore, because the 3,5-dialkyl hydroxybenzyl alcohols are, in general, only slightly soluble in paraffinic solvents, their condensation with dialkylphenols cannot readily be conducted in such media.

It has now been unexpectedly found that by selecting appropriate conditions the reaction can be readily conducted to afford the desired bisphenol products in high yield. Furthermore, under the conditions of the invention, the crystalline bisphenol product precipitates from the reaction medium in high purity, simplifying recovery and purification thereof.

It is therefore an object of this invention to provide a process for preparing bis(dialkyl-hydroxyphenyl)methanes by the condensation of certain hydroxybenzyl alcohols with particular dialkylphenols. Another object is a base-catalyzed process for preparing such bisphenols in high yield and extreme purity. Another object is the provision of novel bis(dialkyl-hydroxyphenyl)methanes prepared by the process of the invention. The conduct of the process in a particular type of solvent is another object thereof. Other objects of the invention will be apparent from the following description of the process.

These objects are accomplished in the following invention by the process which comprises reacting together a dialkylphenol wherein two of the three ring carbon atoms ortho and para to the hydroxyl group are each substituted with an alkyl radical having up to 8 carbon atoms, and the third ring carbon atom has a replaceable hydrogen atom, one of said alkyl radicals having at least three carbon atoms, being branched on the alpha carbon atom, and being attached to an ortho carbon atom, and a 3,5-dialkyl-monohydroxybenzyl alcohol wherein each of the alkyl radicals has up to 8 carbon atoms and one of the alkyl radicals has at least three carbon atoms and is branched on the alpha carbon atom, in a solvent consisting essentially of a monohydric alkanol wherein the hydroxylic carbon atom is attached to at least two carbon atoms, in the presence of a catalytic amount of base. By use of such reactants and conduct of the reaction in the manner specified, bisphenolic compounds having superior antioxidant properties are obtained in high yield and purity.

The process of the invention can be best understood by consideration of the reactants therein and the manner in which the reaction proceeds. As noted above, the reactants are certain dialkyl phenols and certain dialkyl hydroxybenzyl alcohols. The dialkyl phenols are those alkylated monohydroxy benzenes selected from the group consisting of 2,6-dialkyl phenol and 2,4-dialkyl phenol wherein in each of the phenols each of the alkyl radicals has up to 8 carbon atoms and the 2-alkyl substituent has at least 3 carbon atoms and is branched on the alpha carbon atom. Such phenols have the structure

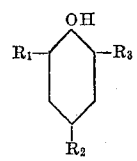

wherein $R_1$ is an alkyl radical having from 3 to 8 carbon atoms and is branched on the alpha carbon atom, and $R_2$ and $R_3$ are selected from the group consisting of the hydrogen atom and alkyl radicals, one of the radicals $R_2$ and $R_3$ being alkyl having up to 8 carbon atoms and the other being the hydrogen atom. Bisphenols prepared from dialkyl phenols having this configuration, wherein the phenolic hydroxyl radical is appreciably hindered by at least one adjacent secondary or tertiary alkyl radical, are materially better antioxidants than bisphenols wherein the alkyl radicals adjacent the hydroxy groups are not branched.

Exemplary of such dialkylphenols are 2-isopropyl-4-methyl phenol, 2-sec-butyl-4-methyl phenol, 2-tert-butyl-4-propyl phenol, 2-tert-amyl-4-isopropyl phenol, 2-tert-hexyl-4-butyl phenol, and their 2,6-dialkyl isomers. Particularly preferred because they possess the most hindered phenolic hydroxyl groups and therefore result in the best bisphenolic antioxidants are 2,6-dialkylphenols wherein both of the alkyl groups are branched on the alpha carbon atom and have from 3 to 8 carbon atoms, e.g., 2,6-diisopropyl phenol; 2,6-di-sec-butyl phenol; 2-isopropyl-6-tert-butyl phenol; 2-sec-butyl-6-tert-amyl phenol, and the like. Most preferred of this subclass are the 2,6-di-tert-alkyl phenols, of which 2,6-di-tert-butyl phenol is exemplary.

With these phenols are reacted 3,5-dialkyl-monohydroxybenzyl alcohols selected from the group consisting of 3,5-dialkyl-2-hydroxybenzyl alcohols and 3,5-dialkyl- 4-hydroxybenzyl alcohols. These alcohols have the structure

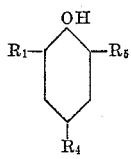

wherein $R_1$ is an alkyl radical having from 3 to 8 carbon atoms and is branched on the alpha carbon atom, and $R_4$ and $R_5$ are selected from the group consisting of alkyl and hydroxymethyl radicals, one of $R_4$ and $R_5$ being an alkyl radical having up to 8 carbon atoms and the other being the hydroxymethyl radical. By hydroxymethyl radical is meant, of course, the monovalent radical —$CH_2OH$, also termed the methylol radical, wherein one of the hydrogen atoms of the methyl radical is replaced with a hydroxyl group.

Typical benzyl alcohols of the class described are 3-isopropyl-5-methyl-4-hydroxybenzyl alcohol; 3,5-diisopropyl-4-hydroxybenzyl alcohol; 3-tert-butyl-5-propyl-2-hydroxybenzyl alcohol; 3-tert-amyl-5-butyl-2-hydroxyl-benzyl alcohol; and the like. For the reasons set forth with respect to the dialkylphenol reactants, the preferred 3,5-dialkyl hydroxybenzyl alcohols are those 3,5-dialkyl-4-hydroxybenzyl alcohols wherein the phenolic hydroxyl group is hindered by two adjacent branched alkyl groups. Representative compounds of this type are 3,5-di-tert-butyl - 4 - hydroxybenzyl alcohol; 3,5 - di - tert - amyl-4-hydroxybenzyl alcohol; 3-tert-butyl-5-tert-octyl-4-hydroxybenzyl alcohol, etc.

These benzyl alcohols are relatively insoluble in water and in paraffinic solvents, but they are soluble in polar organic liquids. When attempts are made to react them in such common solvents as methanol or ethanol, however, it is found that they preferentially undergo reactions with the solvent itself. For example, when 3,5-di-tert-butyl-4-hydroxybenzyl alcohol is dissolved in basic methanol, the base catalyzes the extremely rapid etherification of the benzyl alcohol to the corresponding 3,5-di-tert-butyl-4-hydroxybenzyl methyl ether. The etherification reaction in basic primary alcohol is so rapid that it occurs even in the presence of the dialkylphenol and may be the dominating reaction, even to the exclusion of the condensation between the benzyl alcohol and the phenol.

Surprisingly, however, it has been found that the dialkyl hydroxybenzyl alcohols are more stable in basic alcoholic solution wherein the alcohol is one in which the hydroxylic carbon atom is directly attached to at least two carbon atoms. These alcohols include isopropanol, tert. butanol, methyl isobutyl carbinol, triethyl carbinol, and the like. By using these solvents, the dialkyl hydroxybenzyl alcohols can be reacted with the dialkyl phenols in the presence of a catalytic amount of base without serious interference from the competitive etherification of the benzyl alcohol. Furthermore, these alcohols are excellent solvents for the starting materials and reaction products and thus are superior reaction media to primary alcohols having the same number of carbon atoms. Of these alcohols, the most satisfactory to use, because of its excellent solvency and inertness, is tertiary butyl alcohol. Amounts of solvent of at least about 0.5 mole per mole of the phenol reactant have been found to be convenient, and a range of about 1–20 moles per mole of the dialkylphenol is preferred.

The dialkylphenol and dialkyl hydroxybenzyl alcohols described will react in substantially all molar proportions in the noted alcohols to produce the methane bisphenol products. The preferred dialkylphenol/benzyl alcohol molar ratio is, however, from about 5/1 to about 1/5. Approximately equimolar proportions are, however, the most economical and most convenient to employ; with excess dialkylphenol the production of methane bisphenols is quantitative.

The reaction of the invention will not take place in neutral media. While it does take place in acidic media, reaction of the hydroxybenzyl alcohol with the acid catalyst may be a competing reaction. Furthermore, it has been found that when inorganic acid catalysts are used, they tend to contaminate the product and impair its stability. However, it has unexpectedly been found that for the condensation of the dialkylphenol and the hydroxybenzyl alcohol to proceed, the presence in the reaction medium of a catalytic amount of base gives fast reactions and excellent yields. Useful as basic catalysts are such inorganic compounds as alkali metal hydroxides, including sodium and potassium hydroxide; such alkaline earth hydroxides as calcium, strontium, barium hydroxide, ammonium hydroxide, and such carbonates as sodium carbonate, ammonium carbonate, potassium carbonate, magnesium carbonate, calcium carbonate and barium carbonate. Oxides, including calcium oxide and barium oxide, are also useful. Equally useful are organic base compounds, particularly alkali metal and alkaline earth alcoholotes of the monohydric secondary and tertiary alcohol solvents. Typical alcoholates include the alkali metal alcoholates, such as potassium tert. butoxide and sodium isopropoxide, and the corresponding alkaline earth alcoholates. Such metal salts of phenols as sodium and potassium phenate, lithium cresylate and the like are also useful as basic catalysts. Alkylamines, including monoamines, secondary amines and tertiary amines, as well as quaternary ammonium salts and quaternary ammonium bases, are also useful.

Since only trace amount of basic catalyst are required to activate the condensation of the dialkylphenol and the dialkyl hydroxybenzyl alcohol, basic catalysts which are substantially insoluble in the reaction mixture may be employed. The basic nature of the surfaces of such material as calcium oxide is sufficient to catalyze the reaction. Miscible basic catalysts, such as the alkali metal hydroxides and alcoholates are, however, somewhat more convenient to handle, and are therefore preferred. Catalytic amounts only are required, concentrations of miscible basic catalyst from about 0.0001% by weight, based on the benzyl alcohol reactant, to about 1% by weight having been found sufficient. Larger concentrations of base, in excess of about 5% on the same basis, are of no practical value for increasing the reaction rate beyond that conveniently afforded by smaller amounts, and do increase the likelihood of the benzyl alcohol-alkanol solvent etherification reaction occurring.

Using the proportions of reactants and catalyst described above, the process of the invention may be conducted at any of a wide range of temperatures, particularly from about —10° C. to about 150° C. At very low temperatures in this range, however, the reaction rate becomes very low, while at temperatures in the upper part of the range the base-catalyzed etherification of the hydroxybenzyl alcohol reactant with the solvent as well as other undesirable reactions may take place. The preferred temperature range in which desirable reaction rates are combined with quantitative conversions and yields is that between about 50° C. and about 100° C.

The process may be conducted in batch, semi-batch or continuous manner, since in the preferred mode of reaction the reactants and catalyst are soluble in the alcohol medium. With increase in reaction temperature, the product methane bisphenols become increasingly soluble in the reaction medium, but when the reactant-product mixture is cooled to temperatures below about 40° C. some of the bisphenols precipitate out as crystalline solids and may be readily recovered by filtration, centrifugation, or other conventional methods. The liquid reaction mixture, which may contain unreacted dialkylphenol or dialkyl hydroxybenzyl alcohols and dissolved product, may then be readily recycled after additional reactants have been added. Inasmuch as the product bisphenols are extremely insoluble in water, they may also be separated from the reaction medium by flooding the system with water and recovering the resulting precipitate.

It will be seen that by appropriate selection of dialkylphenol and dialkyl hydroxybenzyl alcohol reactant three types of bisphenolic products may be obtained. In the preferred mode of conducting the reaction, the reactants are a 2,6-dialkylphenol and a 3,5-dialkyl-4-hydroxybenzyl alcohol, and the product is a bis(3,5-dialkyl-4-hydroxyphenyl)methane. This mode is represented by Equation I below.

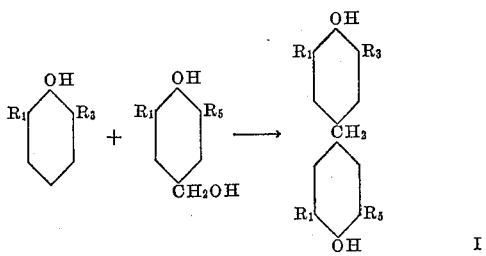

wherein each R has the significance given above. When all four R's are the same alkyl radical, such as tert. butyl, the product is a completely symmetrical methane bisphenol, e.g., bis(3,5-di-tert-butyl-4-hydroxyphenyl)methane. However, by selecting a dialkylphenol wherein the alkyl substituents are different from those of the dialkyl hydroxybenzyl alcohol, and unsymmetrical bisphenol may be obtained wherein one phenolic hydroxyl group has a different activity from the other.

Alternatively, a 2,4-dialkylphenol and a 3,5-dialkyl-2-hydroxybenzyl alcohol may be reacted in the process of the invention to yield bis(3,5-dialkyl-2-hydroxyphenyl)methane. This mode is represented by Equation II below.

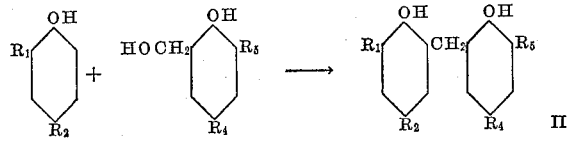

wherein each R has the significance recited above. The product bisphenols are, like the products of Reaction I, known to have valuable antioxidant properties. By appropriate selection of the 2,4-dialkylphenol and the 3,5-dialkyl-2-hydroxybenzyl alcohol, symmetrical or unsymmetrical bisphenolic products may readily be prepared. For example, in the condensation of 2-tert-butyl-4-methyl phenol with 3-tert-butyl-5-methyl-2-hydroxybenzyl alcohol in the process of the invention, the well-known antioxidant bis(3-tert-butyl-5-methyl-2-hydroxyphenyl) methane is prepared in quantitative yield.

However, when a 2,6-dialkylphenol is reacted with a 3,5-dialkyl-2-hydroxybenzyl alcohol in the process of the invention, novel 2,6-dialkyl-4(3',5'-dialkyl-2'-hydroxybenzyl)phenols are produced. Such a mode of conducting the process is represented by Equation III below

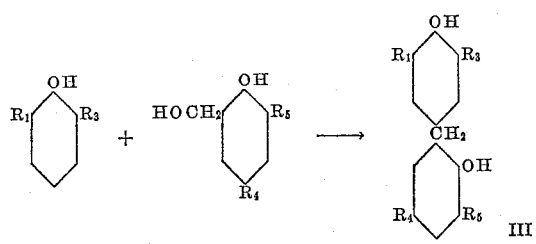

wherein each R has the significance noted above. Thus, when 2,6-di-tert-butyl phenol is condensed with 3-tert-butyl-5-methyl-2-hydroxybenzyl alcohol, the product is 2,6 - di - tert - butyl - 4(3' - tert - butyl - 5' - methyl - 2'-hydroxybenzyl)phenol.

The same type of product is, of course, obtained when 2,4-dialkylphenol is condensed in the process of the invention with 3,5-dialkyl-4-hydroxybenzyl alcohol, as shown in Equation IV.

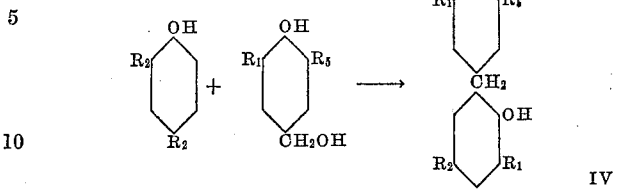

wherein each R is an alkyl radical as described above. Thus, the 2,6-di-tert-butyl-3'-tert-butyl-5'-methyl-2'-hydroxybenzyl)phenol produced by the method represented in Equation III may alternatively be prepared by condensing 2-tert-butyl-4-methyl phenol with 3,5-di-tert-butyl-4-hydroxybenzyl alcohol in a secondary or tertiary alkanol solvent and in the presence of a catalytic amount of base.

It will be recognized that in the bisphenol methane products of Equations III and IV the two phenolic hydroxyl groups have differing activities. These products are, for this reason, useful as antioxidants, antiozonants, and resin intermediates. In the latter application, they may be reacted with epichlorohydrin to yield monoglycidyl monohydroxy ethers or, alternatively, they may be reacted with aldehydes and ketones to yield novolak-type resinous compositions.

To illustrate further the novel process of the invention and the unique properties obtained thereby, the following specific examples are set forth. It should be understood, however, that these examples are merely illustrative and are not to be regarded as limitations to the appended claims, since the basic teachings thereof may be varied at will as will be understood by one skilled in the art. In the examples, the proportions are expressed in parts by weight unless otherwise noted.

*Example I*

To a solution of 11.8 g. (0.05 mole) of 3,5-di-tert-butyl-4-hydroxybenzyl alcohol and 10.3 g. (0.05 mole) of 2,6-di-tert-butyl phenol in 25 ml. tert. butyl alcohol was added 5 ml. of a 2.4% potassium hydroxide tert. butyl alcohol solution (0.0017 mole KOH). The solution was boiled for five minutes, then diluted with about 250 ml. of distilled water. The product bisphenol crystallized from the resulting mixture and was filtered off. The crystalline precipitate was washed with water and dried at 100° C.

In this way 21.8 g. (98.5% yield) of bis(3,5-di-tert-butyl-4-hydroxyphenyl)methane was obtained.

*Example II*

As in the previous example, a tert. butyl alcohol solution containing 2,6-di-tert-butyl phenol and 3,5-di-tert-butyl-4-hydroxy-benzyl alcohol and potassium hydroxide in a 1:0.6:1/50 molar ratio was heated to about 80° C. for about 20 minutes. The mixture was then neutralized by passing in gaseous carbon dioxide while cooling. When the mixture had cooled to 30° C., a large crop of crystal had formed, and these were filtered from the mixture.

In this way, an 80% yield of clain white bis(3,5-di-tert-butyl-4-hydroxyphenyl)methane having a melting point of 151.5–153.5° C., was recovered.

Similar results are obtained when the reaction is conducted in isopropanol in place of tert. butyl alcohol.

*Example III*

To a 6 ml. tert. butyl alcohol solution containing 2.06 g. (0.01 mole) of 2,4-di-tert-butyl phenol and 2.36 g. (0.01 mole) of 3,5-di-tert-butyl-4-hydroxybenzyl alcohol was added 1.0 ml. of a 2.8% potassium hydroxide solution of tert. butyl alcohol. The mixture was heated to about 85° C., for ten minutes and then cooled to room temperature under carbon dioxide.

The mixture was then diluted with 50 ml. of water, and the semisolid amber-colored precipitate filtered off, washed twice with water and taken up in 10 ml. isopentane and filtered. The solids were discarded and the pentane solvent stripped from the filtrate to leave 3.28 g. of an amber liquid. Analysis showed that this liquid included 46% of unreacted 2,4-di-tert-butyl phenol, the remainder being mostly material of the structure

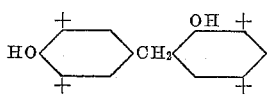

Example IV

A tert. butyl alcohol solution containing approximately equimolar amounts of 2,4-di-tert-butyl phenol and 3,5-di-tert-butyl-2-hydroxybenzyl alcohol and about 1% by weight of KOH, based on the alcohol, was boiled for about five minutes under nitrogen. At the end of this time, the mixture was diluted with an excess of water and neutralized with gaseous carbon dioxide.

A cake of solid material, which had formed in the mixture, was recovered, dried, and taken up in isopentane. The resulting solution was filtered and the filtrate cooled to 0° C. The resulting large crop of white crystals was filtered off, washed with ice cold pentane, and dried.

The resulting crystals, obtained in good yield, had a melting point of 95–98° C. Analysis showed the product to be bis-(3,5-di-tert-butyl-2-hydroxyphenyl)methane.

Example V

When 2-tert-amyl-6-methyl phenol is reacted with 3-tert-amyl-5-methyl-4-hydroxybenzyl alcohol in substantially equimolar amount in diethyl carbinol at 80° C. in the presence of about 0.02 mole of sodium hydroxide, employing the method of Example I, the product bis(3-tert-amyl-5-methyl-4-hydroxyphenyl)methane is obtained in good yield.

Example VI

Approximately equimolar amounts of 2-isopropyl-6-methyl phenol and 3-isopropyl-5-methyl-4-hydroxybenzyl alcohol are reacted for 20 minutes in isopropanol at 70° C. in the presence of 0.1% w., based on the benzyl alcohol of potassium carbonate. The reaction mixture is then cooled to room temperature and diluted with an excess of water.

The resulting precipitate is purified as in previous examples, and from its is obtained in good yield bis(3-isopropyl-5-methyl-4-hydroxyphenyl)methane.

Example VII

By reacting 2,6-xylenol with 3,5-di-t-butyl-4-hydroxybenzyl alcohol in approximately equimolar amounts in tert. butyl alcohol under the conditions of Example I, 3,5-dimethyl-3',5',-di-tert-butyl - 4,4' - dihydroxydiphenyl methane is obtained in excellent yield.

Example VIII

The compound 3,5-dimethyl-3',5'-di-tert-butyl-4,4'-dihydroxydiphenyl methane, obtained in Example VII, is also prepared by reacting 2,6-di-tert-butyl phenol with 3,5-dimethyl-4-hydroxybenzyl alcohol in tert. butyl alcohol containing 0.01 mole percent of potassium hydroxide, at 50° C., cooling the mixture, and recovering the crystallized product.

Example IX

When 2-methyl-6-tert-butyl phenol is reacted with an approximately equimolar amount of 3,5-di-t-butyl-4-hydroxybenzyl alcohol in basic tert. butyl alcohol at about 80° C., a high yield of 3,3',5'-tri-tert-butyl-5-methyl-4,4'-dihydroxydiphenyl methane is obtained by crystallization when the reaction mixture is cooled to room temperature.

Example X

Employing the method of Example IX, 3,5-diisopropyl-3',5'-di-t-butyl-4,4'-dihydroxydiphenyl methane is prepared by reacting together 2,6-diisopropyl phenol and 3,5-di-tert-butyl-4-hydroxybenzyl alcohol in basic tert. butyl alcohol at 85° C., and recovering the product by crystallizing it out at 25° C.

I claim as my invention:

1. A process for preparing bis(3,5-dialkyl-hydroxyphenyl)methane which comprises reacting together a dialkylphenol wherein two of the three ring carbon atoms ortho and para to the hydroxyl group are each substituted with an alkyl radical having up to 8 carbon atoms and the third ring carbon atom of the three ring carbon atoms ortho and para to the hydroxyl group has a replaceable hydrogen atom, at least one of said alkyl radicals being a tertiary alkyl radical having at least four carbon atoms and being attached to an ortho ring carbon atom, and a 3,5-dialkyl-monohydroxybenzyl alcohol wherein each of the alkyl radicals has up to 8 carbon atoms and one of the alkyl radicals has at least four carbon atoms and is a tertiary alkyl radical, in a solvent consisting essentially of a monohydric alkanol wherein the hydroxylic carbon atom is attached to at least 2 carbon atoms, in the presence of a catalytic amount of base.

2. A process for preparing bis(3,5-dialkyl-4-hydroxyphenyl) methane which comprises reacting together 2,6-dialkylphenol and 3,5-dialkyl-4-hydroxybenzyl alcohol, each of the alkyl radicals of the reactants having up to 8 carbon atoms and at least one alkyl radical on each reactant being a tertiary alkyl radical and having at least 4 carbon atoms, in a solvent consisting essentially of a monohydric alkanol wherein the hydroxylic carbon atom is attached to at least two carbon atoms, in the presence of a catalytic amount of base.

3. A process for preparing bis(3,5-dialkyl-4-hydroxyphenyl)methane which comprises reacting together 2,6-dialkylphenol with 3,5-dialkyl-4-hydroxybenzyl alcohol, each of the alkyl radicals of the reactants having from 4 to 8 carbon atoms and being a tertiary alkyl radical, in a tertiary monohydric alkanol solvent, in the presence of a catalytic amount of a miscible metal base.

4. A process for preparing bis(3,5-di-tert-butyl-4-hydroxyphenyl)methane, which comprises reacting together 2,6-di-tert-butyl phenol with 3,5-di-tert-butyl-4-hydroxybenzyl alcohol, in tertiary butyl alcohol, in the presence of a catalytic amount of an alkali metal hydroxide.

5. The process of claim 4, wherein the reaction is conducted at a temperature between about 50° C. and about 100° C.

6. A process for preparing bis(3,5-dialkyl-hydroxyphenyl)methane, which comprises reacting together 2,4-dialkylphenol and 3,5-dialkyl-2-hydroxybenzyl alcohol, each of the alkyl radicals of the reactants having up to 8 carbon atoms and at least one alkyl radical on each reactant being a tertiary alkyl radical and having at least 4 carbon atoms, in a solvent consisting essentially of a monohydric alkanol wherein the hydroxylic carbon atom is attached to at least two carbon atoms, in the presence of a catalytic amount of base.

7. A process for preparing bis(3,5-dialkyl-hydroxyphenyl)methane, which comprises reacting together 2,4-dialkylphenol and 3,5-dialkyl-4-hydroxybenzyl alcohol, each of the alkyl radicals of the reactants having up to 8 carbon atoms and at least one alkyl radical on each reactant being a tertiary alkyl radical and having at least 4 carbon atoms, in a solvent consisting essentially of a monohydric alkanol wherein the hydroxylic carbon atom is attached to at least two carbon atoms, in the presence of a catalytic amount of base.

8. A process for preparing bis(3,5-dialkyl-hydroxyphenyl)methane which comprises reacting together 2,6-dialkylphenol and 3,5-dialkyl-2-hydroxybenzyl alcohol, each of the alkyl radicals of the reactants having up to 8 carbon atoms and at least one alkyl radical on each reactant being a tertiary alkyl radical and having at least 4 carbon atoms, in a solvent consisting essentially of a monohydric alkanol wherein the hydroxylic carbon atom is attached to at least two carbon atoms, in the presence of a catalytic amount of base.

References Cited in the file of this patent

UNITED STATES PATENTS

| | | |
|---|---|---|
| 1,614,171 | Amann et al. | Jan. 11, 1927 |
| 2,807,653 | Filbey et al. | Sept. 24, 1957 |
| 2,947,789 | Ambelang | Aug. 2, 1960 |

OTHER REFERENCES

Faith: Jour. Amer. Chem. Soc., vol. 72 (1950), 837–839.

Ambelang et al.: Jour. Amer. Chem. Soc., vol. 75 (1953), 947–950 (4 pp).

Kharasch et al.: Jour. Organic Chem., vol. 22 (1957), 1435 (1 p.).

Coppinger et al.: Jour. Amer. Chem. Soc., vol. 75 (1953), pp. 734–736.